(12) United States Patent
Strunk et al.

(10) Patent No.: US 7,735,600 B2
(45) Date of Patent: Jun. 15, 2010

(54) MONOLITHIC ACOUSTICALLY-TREATED ENGINE NACELLE INLET PANELS

(75) Inventors: John T. Strunk, Derby, KS (US);
Bradford S. Spiker, Wichita, KS (US)

(73) Assignee: The Boeing Corporation, Chicago, IL (US)

( * ) Notice: Subject to any disclaimer, the term of this patent is extended or adjusted under 35 U.S.C. 154(b) by 376 days.

(21) Appl. No.: 11/608,773

(22) Filed: Dec. 8, 2006

(65) Prior Publication Data
US 2008/0135329 A1 Jun. 12, 2008

(51) Int. Cl.
*B64C 1/12* (2006.01)
*F02K 1/82* (2006.01)

(52) U.S. Cl. .................. 181/210; 181/213; 181/214; 181/292; 244/131; 244/132

(58) Field of Classification Search .................. 181/210, 181/214, 292, 213; 244/1 N, 131, 132
See application file for complete search history.

(56) References Cited

U.S. PATENT DOCUMENTS

| | | | | |
|---|---|---|---|---|
| 3,953,630 A | * | 4/1976 | Roberts et al. ................. | 428/38 |
| 4,235,303 A | | 11/1980 | Dhoore et al. | |
| 4,344,995 A | * | 8/1982 | Hammer ...................... | 428/61 |
| 4,421,811 A | * | 12/1983 | Rose et al. ................... | 428/116 |
| 5,041,323 A | * | 8/1991 | Rose et al. ................... | 428/116 |
| 5,768,778 A | | 6/1998 | Anderson et al. | |
| 6,117,520 A | * | 9/2000 | Wielinga et al. ............. | 428/116 |
| 6,123,170 A | * | 9/2000 | Porte et al. ................... | 181/214 |
| 6,179,943 B1 | * | 1/2001 | Welch et al. ................. | 156/160 |
| 6,183,837 B1 | * | 2/2001 | Kim ............................ | 428/118 |
| 6,761,245 B2 | * | 7/2004 | Porte ........................... | 181/210 |
| 6,767,606 B2 | * | 7/2004 | Jackson et al. .............. | 428/118 |
| 6,857,669 B2 | | 2/2005 | Porte et al. | |
| 2001/0048048 A1 | | 12/2001 | Riedel et al. | |
| 2003/0098200 A1 | * | 5/2003 | Clark ......................... | 181/292 |

FOREIGN PATENT DOCUMENTS

| | | |
|---|---|---|
| CA | 2292096 A1 | 7/2000 |
| EP | 1 020 845 | 7/2000 |
| EP | 1 357 279 | 10/2003 |
| EP | 1 369 555 | 12/2003 |
| GB | 2 273 131 | 6/1994 |

OTHER PUBLICATIONS

International Search Report and Written Opinion dated May 28, 2008 in International Application PCT/US2007/086789.

* cited by examiner

*Primary Examiner*—Jeffrey Donels
*Assistant Examiner*—Jeremy Luks
(74) *Attorney, Agent, or Firm*—Hope Baldauff Hartman LLC

(57) ABSTRACT

An acoustic, noise-attenuating panel for an aircraft engine nacelle inlet. The panel includes at least three layers: (a) a perforated film; (b) a sound attenuating core; and (c) a structural layer. The structural layer has through-holes adapted for receiving fasteners that are configured to engage structure of an engine nacelle. The structural layer is fabricated, at least at its ends, of a material sufficiently strong so that when fasteners are engaged in the through-holes in the layer's ends, the fasteners retain the acoustic panel in a nacelle inlet under conditions of use. Alternatively, or in addition, the structural layer ends may be reinforced at the through-holes with reinforcing strips.

17 Claims, 3 Drawing Sheets

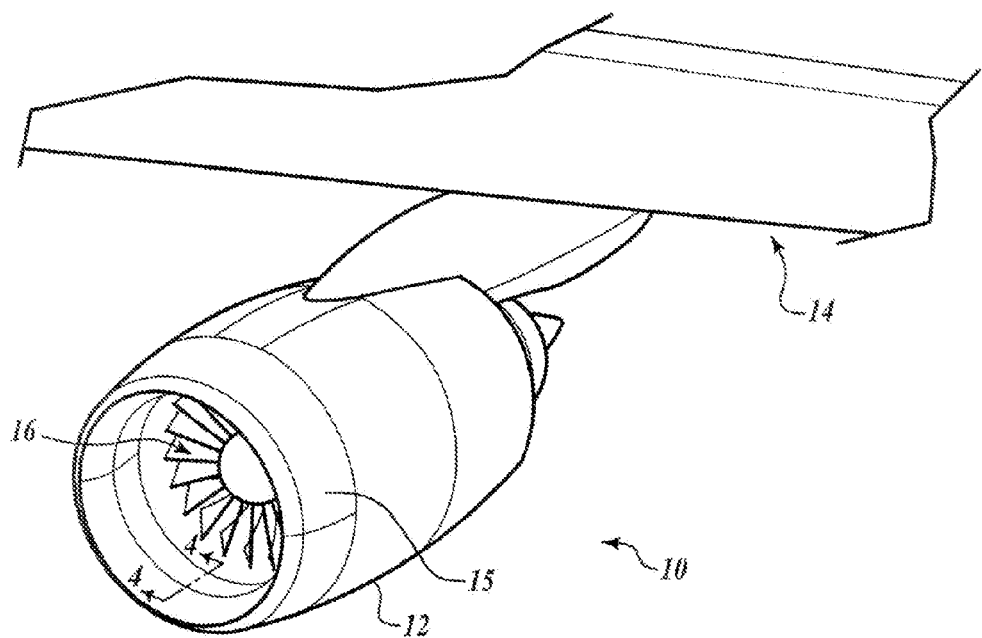
FIG.1 *(PRIOR ART)*
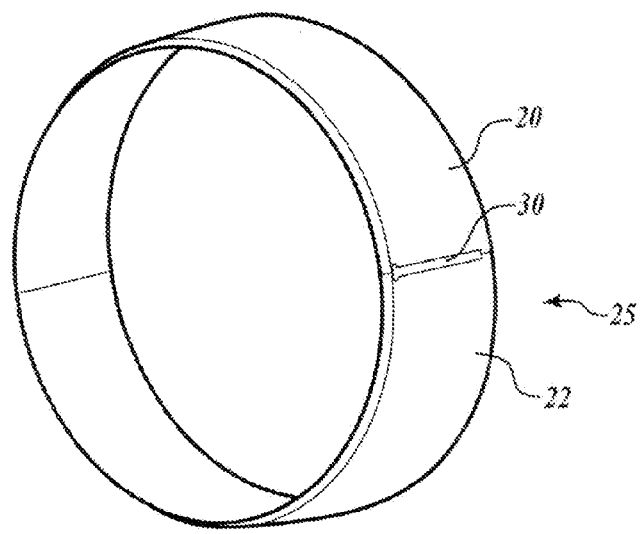
FIG.2 *(PRIOR ART)*

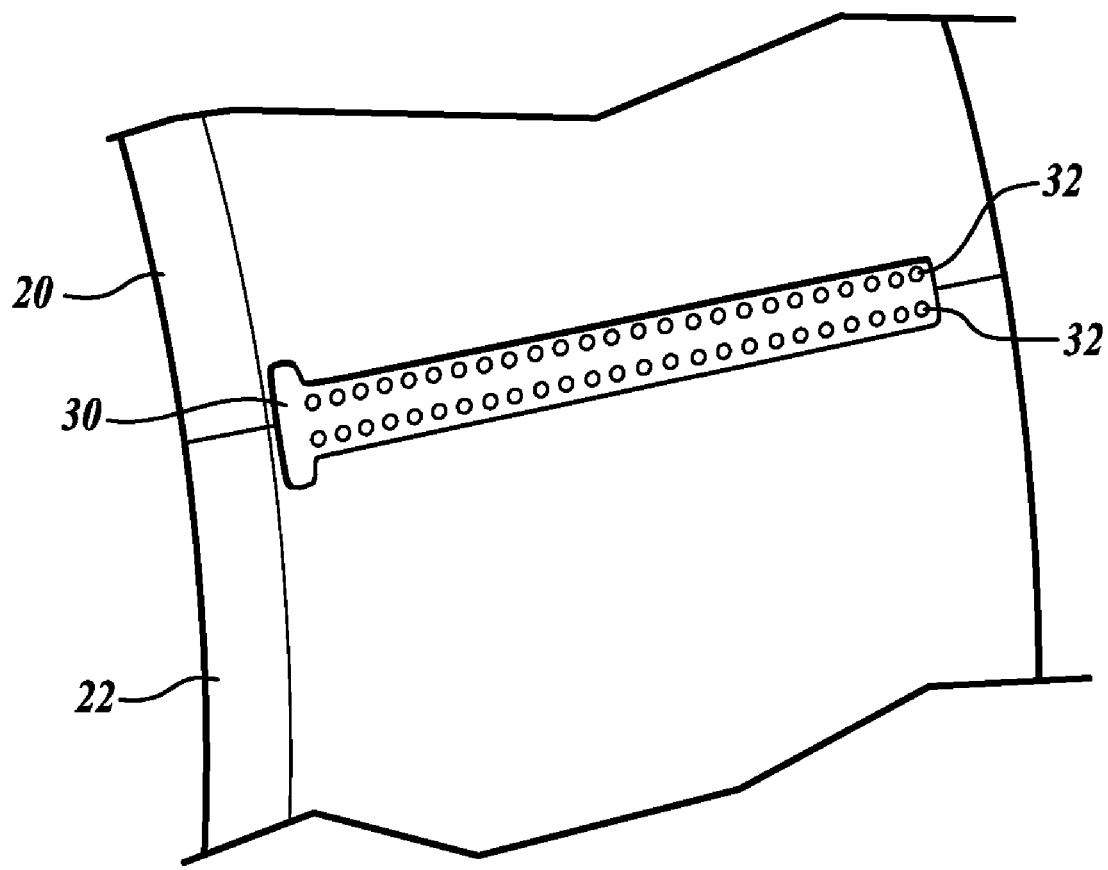
FIG.3 *(PRIOR ART)*

MONOLITHIC ACOUSTICALLY-TREATED ENGINE NACELLE INLET PANELS

TECHNICAL FIELD

The present disclosure relates generally to aircraft engine noise reduction. More particularly, the disclosure relates to engine noise reduction through use of acoustically-treated engine nacelle inlet panels.

BACKGROUND

Aircraft noise reduction is an ongoing concern at airports around the world, as air traffic continues to increase and as people living near airports, or along aircraft take-off and landing flight paths, express concerns about aircraft noise. Accordingly, most airport facilities have regulations that set noise limits and that control aircraft flight paths on take off and landing. Some airport facilities now provide financial incentives or restrict terminal privileges to encourage airlines to reduce noise even further.

Aircraft noise has several sources, for example engine noise, landing gear orientation upon take off and landing, aircraft aerodynamic effects, among others. Accordingly, noise abatement is a complex issue. A strategy for addressing aircraft noise reduction is to consider each component of the aircraft, such as engine, landing gear, wings, etc., separately to make component-specific determinations. Consideration should also be given to other factors that may limit component-specific attenuation efforts, such as safety considerations. For example, reducing engine speed may reduce engine noise, but may be hazardous when an aircraft is fully loaded, taking off from a higher altitude airport under hot weather conditions. Certain airports may have relatively short runways for take off, necessitating high engine loads which result in higher noise levels.

The engine is one of the major noise generators on an aircraft. Much effort has been devoted to engine noise reduction. Newer engine designs may produce less noise than older but still useful engines. With so many aircraft already in service, and with such a high investment in existing engines that have a long useful life span, routine engine replacement for lower levels of sound generation may not be commercially feasible.

One of the sources of engine noise is the engine nacelle inlet area. To reduce noise in the nacelle inlet area, an acoustic panel is deployed as a lining at the nacelle air inlet. The acoustic panel is comprised of two separate acoustic panel halves that are joined at their ends to form a hoop shape that approximates the nacelle inlet shape. These acoustic panels have "non-acoustically treated" areas that are necessary to provide strengthened attachment points for the panel halves to the nacelle inlet. The non-acoustically treated areas do not, therefore, provide noise attenuation like the other areas of the panels. In addition, fastening the panel halves in place requires a splice fitting that has a plurality of fasteners extending through it. These fasteners create discontinuities in the otherwise smooth surface at the nacelle inlet thereby presenting a further source of noise at the nacelle inlet.

Accordingly, it is desirable to develop an acoustically-treated nacelle inlet panel for aircraft noise reduction. In addition, it is desirable that the panel be monolithic or "single piece" to reduce the need for a splice fitting with exposed fasteners projecting into the nacelle air inlet. It is also desirable that the panel be free of areas that are not acoustically treated. Furthermore, other desirable features and characteristics of the present invention will become apparent from the subsequent detailed description and the appended claims, taken in conjunction with the accompanying drawings and the foregoing technical field and background.

BRIEF SUMMARY

Embodiments of acoustic panels for aircraft engine nacelles have complete acoustic treatment around the entire circumference of the nacelle inlet. The acoustic panels are free of fasteners or other structures that project into the nacelle inlet airflow that may generate noise. Moreover, the acoustic panels are structurally acceptable in terms of strength for attachment to the inlet of an engine nacelle to attenuate noise. The acoustic panels are "monolithic" in the sense of being a layered composite structure with all layers bonded together to form an integral single panel. Embodiments of the acoustic panels may be retrofitted to existing engine nacelles and may also be used on new engine nacelles.

In one embodiment, the acoustic panels have a layered, integral structure comprising, in order: (a) a perforated film; (b) a sound attenuating core; and (c) a structural layer having a region with through-holes adapted for receiving fasteners configured to engage structure of an engine nacelle. At least the through-holed region is of a material sufficiently strong such that when fasteners are engaged in the through-holes, the fasteners retain the acoustic panel in an engine nacelle inlet under conditions of use.

BRIEF DESCRIPTION OF THE DRAWINGS

A more complete understanding of the present disclosure may be derived by referring to the detailed description and claims when considered in conjunction with the following figures, wherein like reference numbers refer to similar elements throughout the figures.

FIG. 1 is a prior art perspective view of an aircraft engine nacelle;

FIG. 2 is a schematic perspective view showing two prior art acoustic panel halves joined to each other;

FIG. 3 is an expanded partial external view of FIG. 2 showing the splice fitting and fastener coupling the acoustic panel halves together and to the nacelle;

DETAILED DESCRIPTION

Figure 4:
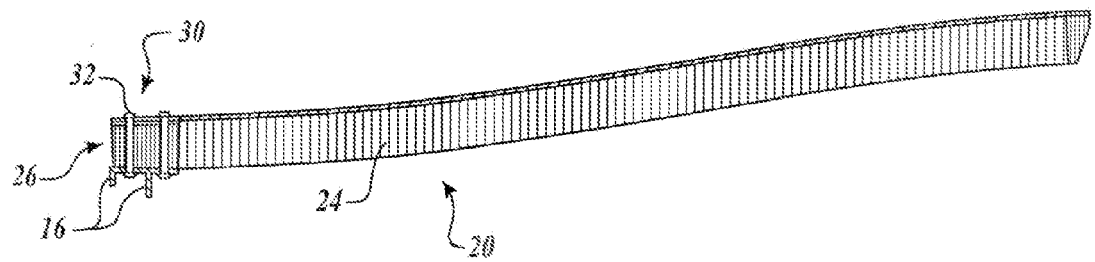
FIG. 4 is a cross sectional view of a prior art acoustic panel.

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

As a preliminary matter, FIG. 1 illustrates an aircraft engine 10 encased in a nacelle 12 and attached to a wing 14. The engine 10 has a turbine 16 that rotates to pull air into the engine through the front end inlet 15 of the nacelle 12. The high volume and speed of air rushing in through the nacelle inlet 15 creates noise. In an effort to abate this noise, nacelle inlet 15 has an acoustic panel 25 comprised of two halves 20, 22 located at the inlet of the nacelle 12.

As shown in FIG. 2, the acoustic panel halves 20, 22 are shaped as semi-circles, and are joined together at their ends to form a circular shaped panel 25. Panel 25 fits into the nacelle inlet 15, and is attached to the inner surface of the nacelle inlet as shown in more detail in FIG. 4. The acoustic panel halves 20, 22 are spliced together at their ends using a splice fitting 30 and fasteners 32. FIG. 3 illustrates the splice fitting 30 and fasteners 32, and shows that the fasteners project into the inlet 15 of the nacelle 12. This tends to generate noise when air rushes over the splice fitting and fasteners.

In addition, in the region where the splice fitting 30 and fasteners 32 are located, the acoustic panel halves 20, 22 have reduced noise attenuation properties. Referring to FIG. 4, a cross sectional view of a panel half 20 in the vicinity of the splice fitting 30 and fasteners 32, the panels have a core 24 of honeycombed light weight material that has sound attenuation properties. However, honeycomb material is not strong and some strength is needed at the region where fasteners 32 penetrate the core 24 to fasten it to structure 16 of the nacelle inlet 15. But, as illustrated in FIG. 4, the acoustic core 24 of panel half 20 is fortified in through-holed panel region 26 to provide strength so that fasteners 32 may penetrate the panel at a strengthened region 26 to affix the panel half 20 in place in the nacelle inlet 15 by attachment to structure 16. The fortification of the region 26 reduces noise attenuation of the panel half 20, and together with the splice fitting 30 and fasteners 32 result in higher levels of noise.

According to certain embodiments, acoustic panels have complete acoustic treatment and do not have regions where sound attenuation properties are impaired to any significant extent. There are no fasteners or other structure that project into the nacelle inlet airflow that may generate noise. Instead, the nacelle air inlet region is smooth and free of discontinuities or interruptions (such as counter-sunk fastener holes, for example) and projections (such as fasteners, for example) on surface areas presented to the incoming airflow. Moreover, the panels are structurally acceptable in terms of strength for attachment to the inlet of an engine nacelle to attenuate noise. The panels are of semicircular shape so that a pair may be joined end to end to completely line the inlet of a nacelle, or circular in shape so that only one panel may suffice to line the nacelle inlet. The acoustic panel is "monolithic" in the sense of being a layered composite structure with all layers bonded together to form an integral single panel. Panels may be retrofitted to existing engine nacelles and may also be used on new engine nacelles.

Some embodiments of the acoustic panels are made up of a series of layers that are bonded together. Each layer performs a function, as described herein. In general, the acoustic panels have at least three layers bonded together to form a monolithic or integral panel. The panels have at least the following three layers in order, but other layers may be interposed between these for specific purposes: an outer perforated film or textile layer, also referred to as an acoustic liner, facing the nacelle inlet airflow, a core layer of light weight acoustic material (i.e. material that attenuates noise, such as honeycomb core), and a structural or backing layer. This structural layer is sufficiently strong to permit fasteners extending through a through-holed region of the layer to secure the panel to nacelle structure without tearing the structural layer under ordinary conditions of use. Alternatively, or in addition, reinforcing strips may be used to bear some of the stress forces exerted at the through-holed regions of the structural layer. These reinforcing strips have through-holes that register with through-holes in the through-holed region, and fasteners extend through these holes transferring stress to the reinforcing strips. In general, when fasteners are used to secure the structural layer, the fasteners are installed from the back of the panel. A typical example of these fasteners includes the fastener sold as Accu-Lok™ FCB2110 by Alcoa (of Pittsburgh, Pa., USA). Similar or equivalent fasteners are also useful.

Figure 5:
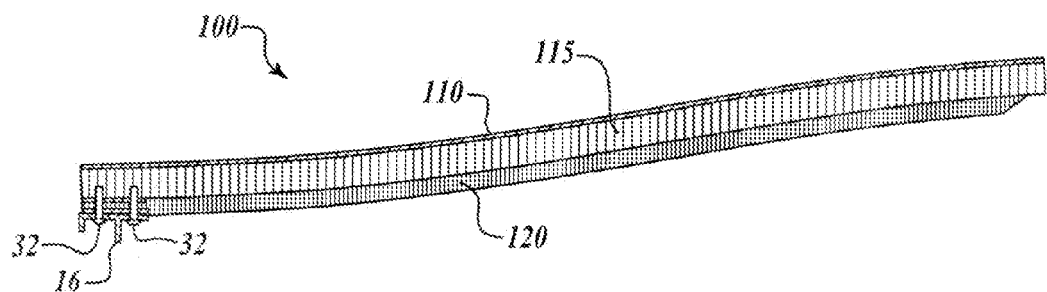
FIG. 5 is a cross sectional view of an embodiment of an acoustic panel.

An example of an embodiment of the monolithic nacelle inlet acoustic panels is illustrated in cross section in FIG. 5. The acoustic panel 100 is made up of a series of bonded-together layers. The outer layer 110, i.e. the layer facing the airflow in the nacelle inlet 15 (FIG. 1) is fabricated of a perforated material. For example, a polymer film or textile with minute perforations. Non-limiting examples of such films and textiles include: graphite/epoxy composite laminate skin, fiberglass/epoxy laminate, metallic skin, such as aluminum or titanium, and the like. This outer layer 110 forms an acoustic face sheet.

Bonded to the back of the outer layer 110, i.e. on the side of the outer layer that is opposite the side facing airflow in the nacelle inlet, is a core 115 of a light weight, sound attenuating material. For example, this sound attenuating material may be honeycomb material such as fiberglass honeycomb with a ⅜ inch (about 8.5 mm) cell size or metallic honeycomb of ⅜ inch cell size, and like or equivalent material. Honeycomb material is generally made up of materials that include hollow structure, referred to as "cells". Typically, the cells are hexagonal although other geometric shapes are also possible. The cells are usually hollow and either air filled or filled with foam. When honeycomb material is used, the cells size may be in the range from about ¼ to about ½ inch (about 6.5 to about 13 mm). Other sizes, such as ⅜ inch (about 8.5 mm) cells are also useful. Any suitable aerospace approved bonding agents and adhesives may be used to bond the layers of the acoustic panel 100 to each other. Sound vibrations, such as noise, that penetrate the acoustic septum or perforated outer layer 110 are attenuated in the core layer 115. Because of its cellular structure, the core 115 generally is not so structurally strong that it can be penetrated by fasteners to reliably secure the panel 100 to a nacelle inlet.

A structural layer 120 is bonded to the back of the acoustic core 115. This structural layer 120 desirably also has sound attenuating properties but has greater strength than the acoustic core 115. The structural layer 120 should be sufficiently strong at least in its through-holed region 122 (FIG. 6) to permit penetration by fasteners 32 and securing the structural layer 120 to structure 16 of the nacelle 12 during ordinary conditions of use. Alternatively, or in addition, reinforcing strips may be used to bear some of the stress forces exerted at the through-holed regions 122 of the structural layer, as described below. In addition, the material of the structural layer 120 should be light weight. For example, the structural layer 120 may be made of honeycomb material of higher density that has smaller cells than the acoustic panel: smaller cells and higher density generally lead to higher mechanical strength. For example, commercially available Hexcell HRH-36-⅛-3.0 honeycomb core and Hexcell HTP-3/16-8.0 honeycomb core among others. (Hexcell is a British company)

To add strength, the structural layer ends 122 may be stronger than the other portions of the structural layer 120. Thus for example, the structural layer 120 may be fabricated with denser honeycomb material at through-holed regions (here shown as end regions) 122, which are then supplied with through-holes to receive fasteners 32. The structural layer through-holed regions 122 should be sufficiently strong that they can be penetrated by fasteners to reliably secure the panel 100 to a nacelle inlet.

Figure 6:
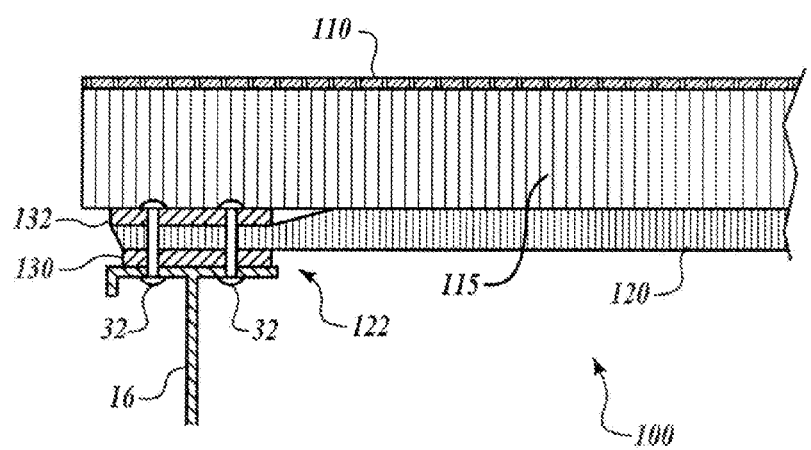
FIG. 6 is a partial cross sectional view of an embodiment of an acoustic panel showing reinforcing members at structural layer through-holes.

Alternatively, or in addition, the through-holed regions 122 of the structural layer 120 may also be sandwiched between a pair of reinforcing members at the through holed region 122 of the structural layer 120. In addition, these reinforcing members may be light weight strong strips 130 that extend across the structural layer 120, from front to rear, to cover each through hole. These strips should have through-holes that register with through-holes in the through-holed region 122 of structural layer 120. For example, as shown in FIG. 6, strips 130, 132 of a graphite-epoxy, or other composite or light strong material, extend across the structural layer 120. The strips 130, 132 have through-holes to receive the shanks of fasteners 32 and bear loads imposed on the fasteners 32 when the acoustic panel 100 is affixed to the structure 16 of the nacelle 12. Accordingly, the strips 130, 132 shield the structural layer 120 from forces tending to tear the acoustic panel 100 at vulnerable stress points where it has through-holes. Fasteners 32, engaged with nacelle structure 16, pass through the holes in the first strip 130, then holes in the structural layer 120 at region 122, and then holes in the second strip 132.

As shown in FIGS. 5 and 6, the fasteners 32 penetrate the structural layer 120 and partially penetrate the acoustic core 115, but do not pass through the acoustic core 115. Accordingly, the acoustic face sheet 110 is not penetrated by protruding fasteners 32 and the acoustic face sheet 110 therefore presents a smooth outer surface to air flowing over its surface. This reduces noise. Further, the acoustic core 115 surrounds the entire circumference of the nacelle inlet 15. This also reduces noise.

While embodiments have been described with particular reference to aircraft engine nacelles, the embodiments are, of course, also applicable in other machinery where airflow at relatively high speed rates poses a noise issue. Thus, the embodiments presented here, or modifications thereof, may be used in connection with other types of air inlets to attenuate noise caused by incoming air flow. In general, the embodiments are useful in devices where air moves past at high speed, including without limitation mobile platforms such as missiles, trucks, trains, maritime vessels, and stationary industrial equipment such as turbines and other machinery.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. An acoustic panel for an engine nacelle inlet, the panel having a first end and a second end, and comprising:
    a layered, integral structure comprising, in order:
    (a) a perforated film extending from the first end to the second end;
    (b) a sound attenuating core comprising a first honeycomb material extending from the first end to the second end; and
    (c) a structural layer comprising
        a second honeycomb material having a higher density than the first honeycomb material, the second honeycomb material extending from the first end to the second end, wherein the second end is in contact with the first end, and wherein the second honeycomb material further comprises a region with through-holes adapted for receiving fasteners configured to engage structure of an engine nacelle, wherein the through-holes extend through the structural layer, but do not extend through the sound attenuating core and do not penetrate the perforated film, such that an outer surface of the perforated film is smooth and free of discontinuities and projections into an airflow path.

2. The panel of claim 1, wherein the perforated film comprises a perforated organic polymeric film.

3. The panel of claim 1, wherein the perforated film comprises a textile material.

4. The panel of claim 1, wherein the first honeycomb material has a cell size of about 0.25 to about 0.5 inches.

5. The panel of claim 1, wherein the perforated film is bonded to a first side of the sound attenuating core.

6. The panel of claim 5, wherein the structural layer is bonded to a second side of the sound attenuating core, the second side opposite the first side of the sound attenuating core.

7. The panel of claim 1, wherein the first honeycomb material has a cell size of less than about 0.375 inches.

8. The panel of claim 1, further comprising in the through-holed region of the structural layer, a reinforcing member on each side of through-holes of the through-holed region, the reinforcing members having through-holes registering with through-holes in the through-holed region of the structural layer so that when the acoustic panel is affixed to an inlet of an engine nacelle, fasteners will extend through the through-holes of the reinforcing members.

9. The panel of claim 1, further comprising in the through-holed region of the structural layer, a strip of composite material on each side of through-holes of the through-holed region, the strips having through-holes registering with through-holes in the through-holed region of the structural layer so that when the acoustic panel is affixed to an inlet of a aircraft nacelle, fasteners will extend through the through-holes of the strips.

10. The panel of claim 1, wherein the through-holed region of the structural layer has greater strength than other regions of the structural layer.

11. An acoustic panel for an engine nacelle inlet, the panel having a first end and a second end, and comprising:
    (a) a perforated film forming an acoustic liner extending from the first end to the second end;
    (b) a sound attenuating core comprising a first honeycomb material extending from the first end to the second end and having a first side and a second side, the first side bonded to the perforated film; and
    (c) a structural layer bonded to second side of the sound attenuating core, the structural layer comprising
        a second honeycomb material having a higher density than the first honeycomb material, the second honeycomb material extending from the first end to the second end, wherein the second end is in contact with the first end, and wherein the second honeycomb material comprises a region having through-holes adapted for receiving fasteners configured to engage structure of an engine nacelle, wherein the through-holes extend through the structural layer, but do not extend through the sound attenuating core and do not penetrate the perforated film, such that an outer surface of the perforated film is smooth and free of discontinuities and projections into an airflow path.

12. The panel of claim 11, further comprising in the through-holed region of the structural layer, a reinforcing member on each side of through-holes of the through-holed region, the reinforcing members having through-holes registering with through-holes in the through-holed region of the structural layer so that when the acoustic panel is affixed to an inlet of a aircraft nacelle, fasteners will extend through the through-holes of the reinforcing members.

13. The panel of claim 11, further comprising in the through-holed region of the structural layer, a strip of composite material on each side of through-holes of the through-holed region, the strips having through-holes registering with through-holes in the through-holed region of the structural layer so that when the acoustic panel is affixed to an inlet of a aircraft nacelle, fasteners will extend through the through-holes of the strips.

14. The panel of claim 11, wherein the through-holed region of the structural layer has greater strength than other regions of the structural layer.

15. An acoustic panel for an airway inlet, the panel having a first end and a second end, and comprising:
 (a) a perforated film forming an acoustic liner, the liner extending from the first end to the second end and having a first side and a second side, the first side for facing airflow;
 (b) a sound attenuating core comprising a first honeycomb material with a cell size in the range from about 0.025 to about 0.5 inches, the sound attenuating core extending from the first end to the second end, and having a first side and a second side, the first side bonded to the second side of the perforated film; and
 (c) a structural layer comprising
 a second honeycomb material having a higher density than the first honeycomb material, the structural layer bonded to second side of the sound attenuating core, the structural layer extending from the first end to the second end, wherein the second end is in contact with the first end, and wherein the second honeycomb material comprises a through-holed region having through-holes adapted for receiving fasteners configured to engage structure proximate the airway inlet, wherein the through-holes extend through the structural layer, but do not extend through the sound attenuating core and do not penetrate the perforated film, such that an outer surface of the perforated film is smooth and free of discontinuities and projections into an airflow path.

16. The panel of claim 15, further comprising, in the through-holed region of the structural layer, a strip of composite material on each side of through-holes of the through-holed region, the strips having through-holes registering with through-holes in the through-holed region such that, when the acoustic panel is affixed to an underlying structure of an airway inlet that is in use, the acoustic panel is retained in position.

17. The panel of claim 15, wherein the through-holed region of the structural layer has greater strength than other regions of the structural layer.

* * * * *